Nov. 24, 1925.

A. MILLER 1,562,903

ELECTRICAL DRIVE FOR AUTOMOBILES

Filed June 16, 1924

Inventor
Adolph Miller
By his Attorney

Patented Nov. 24, 1925.

1,562,903

UNITED STATES PATENT OFFICE.

ADOLF MILLER, OF NEW YORK, N. Y.

ELECTRICAL DRIVE FOR AUTOMOBILES.

Application filed June 16, 1924. Serial No. 720,175.

*To all whom it may concern:*

Be it known that I, ADOLF MILLER, a citizen of Germany, residing at New York, in the county of New York and State of New York, have invented certain new and useful Improvements in Electrical Drives for Automobiles, of which the following is a specification.

This invention relates to improvements in the application of power to the driving of automobiles and has as one of its objects the provision of a secondary or storage battery capable of being charged with a current of electricity from any generating source, to energize a motor by which the automobile is actuated.

A further purpose is in the provision of means whereby the battery may be partially restored by an electric current obtained from a dynamo mounted on the chassis of the automobile and arranged in such manner that as the car moves by gravity, as down an inclined plane, current will be generated and introduced into the battery.

Another aim is in the provision of practical means for the economical production of a relatively large amount of motor power thus generated.

These several objects are attained by the novel construction, combination and arrangement of parts hereafter more fully described and shown in the accompanying drawing, forming a part hereof, and in which:—

Figure 1:
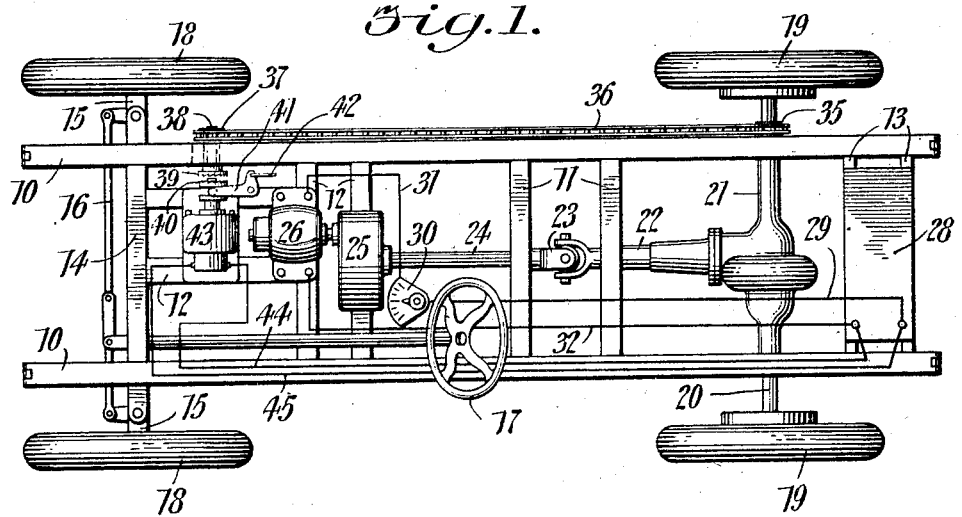
Figure 1 is a plan view of a conventional type of automobile chassis showing the application of the invention.
Figure 2:
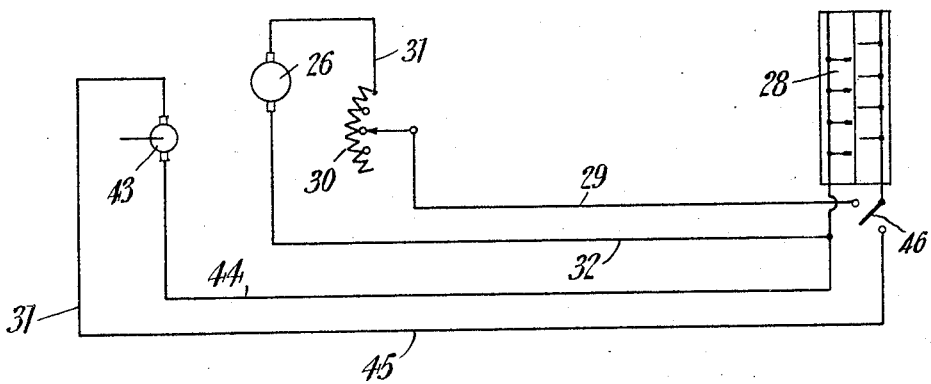
Figure 2 is a diagrammatic view indicating the electrical circuits employed.

Referring to the drawing more in detail, the numeral 10 indicates the chassis frame of the automobile, the same being connected by cross bars 11 at the center, similar bars 12 being at a point nearer the front and the other like bars 13 at the rear.

This frame is supported upon a front axle 14, having at its ends, the usual pivoted knuckle spindles 15 controlled by the rod 16, operated by the steering wheel 17.

The forward wheels 18 are mounted on the knuckles in the usual manner and the rear wheels 19 are secured upon the rear axle 20, this axle having between the sides of the chassis frame, a casing 21 containing the driving mechanism and differential, actuated by the shaft 22, connected by a universal joint 23 with the driving shaft 24, operated by reduction gears in the casing 25; this train of reducing gears is driven by the motor 26 which, together with the casing, rests upon the cross bars 12.

Secured upon the rear cross bars 13 is a storage battery 28 which may be charged in the usual manner. Current is conducted from the storage battery by a wire 29 connecting with a rheostat 30, from which a wire 31 extends to the motor 26, return current passing by the wire 32 to the battery 28.

Fixed on the rear axle 20 is a sprocket wheel 35, driving a chain 36 communicating rotary motion to another sprocket wheel 37 fixed on the end of a shaft 38 journalled in the chassis frame and on which is a fixed clutch member 39 engageable with a sliding clutch member 40, operated by a shift fork 41, provided with a rod 42 extending into position for easy access by the operator of the car.

When the clutch members are in engagement, rotary motion is communicated to a dynamo or generator 43 from which current is conducted by wires 44 and 45 to the storage battery 28. A two way switch 46 is disposed at the junction of the conductor wire 29 with the conductor 45, at a point near the storage battery, this switch controlling current to the rheostat 30 and motor 26.

Thus it will be seen that the energy of the storage battery is used in propelling the car along level surfaces or going up a grade, but in coasting down a hill, the current can be cut off the motor, while the weight of the car in running down the hill, acts by gravity to actuate the generator 43, the current therefrom being restored to the battery 28, producing a great conservation of energy.

From the foregoing it will be seen that a device has been disclosed which is capable of running a vehicle solely by an electric current and its own gravity in such manner that a material saving of the current results.

Having thus described my invention, what I claim as new and desire to secure by Letters Patent, is:—

1. An electrical drive for automobiles comprising a battery, a motor carried on the automobile and directly geared with the rear axle thereof, a generator carried on the automobile, connections between the rear axle and said generator, and control means intervening in said connections whereby the generator may be actuated when the automobile is moving down an incline and remain quiet at other times.

2. An electrical drive for automobiles comprising a storage battery, a motor geared to the driving axle of the automobile, said motor having a speed reducing train and a controller, a generator carried on said automobile, said generator having an extending shaft, a second shaft in register therewith, clutch connections between said shafts, a sprocket on said second shaft, a sprocket on the rear axle, and a chain connecting said sprockets whereby the generator may be actuated and current conveyed from the generator to said storage battery when the automobile is going down an incline.

In witness whereof I have signed my name.

ADOLF MILLER.